US009610909B2

(12) United States Patent
Richeton et al.

(10) Patent No.: US 9,610,909 B2
(45) Date of Patent: Apr. 4, 2017

(54) CRASH-RESISTANT STRUCTURAL PART FOR AUTOMOBILE AND MANUFACTURING METHOD THEREOF

(71) Applicants: HYUNDAI MOTOR COMPANY, Seoul (KR); KIA MOTORS CORPORATION, Seoul (KR); Hyundai Motor Europe Technical Center GmbH, Russelsheim (DE)

(72) Inventors: Julien Richeton, Frankuft am Main (DE); Dae Seok Jeong, Hwaseong-si (KR); Jerome Coulton, Maintal (DE); Stephane Ringenbach, Frankfurt am Main (DE)

(73) Assignees: HYUNDAI MOTOR COMPANY, Seoul (KR); KIA MOTORS CORPORATION, Seoul (KR); HYUNDAI MOTOR EUROPE TECHNICAL CENTER GMBH, Russelsheim (DE)

( * ) Notice: Subject to any disclaimer, the term of this patent is extended or adjusted under 35 U.S.C. 154(b) by 124 days.

(21) Appl. No.: 14/255,615

(22) Filed: Apr. 17, 2014

(65) Prior Publication Data
US 2015/0129116 A1    May 14, 2015

(30) Foreign Application Priority Data
Nov. 11, 2013   (DE) .................. 10 2013 222 923

(51) Int. Cl.
*B29C 70/52*    (2006.01)
*B60R 19/03*    (2006.01)
(Continued)

(52) U.S. Cl.
CPC .............. *B60R 19/03* (2013.01); *B29C 70/16* (2013.01); *B29C 70/52* (2013.01); *B60J 5/0444* (2013.01);
(Continued)

(58) Field of Classification Search
CPC ......... B29C 70/06; B29C 70/16; B29C 70/52; B29C 70/525; B29K 2105/0002;
(Continued)

(56) References Cited

U.S. PATENT DOCUMENTS 4,749,613 A  *  6/1988  Yamada ................. B29C 43/02
                                           293/109
4,948,196 A  *  8/1990  Baba ...................... B60J 5/0447
                                           296/146.6
(Continued)

FOREIGN PATENT DOCUMENTS

FR         2504449 A1 *  10/1982
JP        H08-300467 A     11/1996
(Continued)

*Primary Examiner* — Michael Tolin
(74) *Attorney, Agent, or Firm* — McDermott Will & Emery LLP (57) ABSTRACT

A method of manufacturing a crash-resistant structural part for an automobile, the crash-resistant structural part including a beam element for receiving an impact force during a crash of the automobile is provided. The method comprises a step of arranging at least one layer of fibers having a length of 100 mm or more, and a step of mixing components required to form a thermoplastic polymer resin, the components including a reactive monomer, thereby forming a liquid precursor mixture of the thermoplastic polymer resin. At least one layer of fibers is impregnated with the liquid precursor mixture, and the beam element is formed by an in-situ polymerization reaction of the liquid precursor mixture having impregnated the at least one layer of fibers.

10 Claims, 10 Drawing Sheets

(51) Int. Cl.
 *B60R 19/12*  (2006.01)
 *B60R 19/18*  (2006.01)
 *B29C 70/16*  (2006.01)
 *B60J 5/04*  (2006.01)
 *B29L 31/00*  (2006.01)
 *B29K 309/08*  (2006.01)
 *B29K 307/04*  (2006.01)
 *B29K 75/00*  (2006.01)
 *B29K 77/00*  (2006.01)
 *B29K 73/00*  (2006.01)
 *B29L 31/30*  (2006.01)
 *B29K 105/00*  (2006.01)
 *B62D 29/04*  (2006.01)

(52) U.S. Cl.
 CPC .............. *B60R 19/12* (2013.01); *B60R 19/18* (2013.01); *B29K 2073/00* (2013.01); *B29K 2075/00* (2013.01); *B29K 2077/00* (2013.01); *B29K 2077/10* (2013.01); *B29K 2105/0002* (2013.01); *B29K 2307/04* (2013.01); *B29K 2309/08* (2013.01); *B29K 2313/00* (2013.01); *B29L 2031/003* (2013.01); *B29L 2031/3044* (2013.01); *B60R 2019/1853* (2013.01); *B62D 29/04* (2013.01)

(58) Field of Classification Search
 CPC ....... B29L 2031/003; B29L 2031/3044; B60R 19/03; B60R 19/12; B60R 19/18; B60R 2019/1853; B60J 5/0443; B60J 5/0444; B62D 21/157
 See application file for complete search history.

(56) References Cited

U.S. PATENT DOCUMENTS

| | | | | |
|---|---|---|---|---|
| 6,231,094 | B1* | 5/2001 | Uytterhaeghe | B29C 43/02 264/257 |
| 6,346,325 | B1 | 2/2002 | Edwards et al. | |
| 7,004,519 | B2* | 2/2006 | Roussel | B60R 19/18 293/120 |
| 7,111,882 | B2* | 9/2006 | Corscadden | B29C 70/46 293/120 |
| 8,163,379 | B2* | 4/2012 | Doecker | B32B 3/12 428/119 |
| 2010/0291819 | A1* | 11/2010 | Kirchner | B29C 70/00 442/64 |
| 2011/0204611 | A1* | 8/2011 | Ziegler | B29C 70/521 280/781 |
| 2012/0025545 | A1* | 2/2012 | Haneda | B60R 19/18 293/102 |

FOREIGN PATENT DOCUMENTS

| | | |
|---|---|---|
| JP | H09-216225 A | 8/1997 |
| JP | 2005-324733 A | 11/2005 |
| KR | 10-2005-0102203 A | 10/2005 |

* cited by examiner

CRASH-RESISTANT STRUCTURAL PART FOR AUTOMOBILE AND MANUFACTURING METHOD THEREOF

CROSS-REFERENCE TO RELATED APPLICATIONS

This application claims the benefit of priority to German Patent Application No. 102013222923.2 filed in the German Intellectual Property Office on Nov. 11, 2013, the entire contents of which are incorporated herein by reference.

TECHNICAL FIELD

The present disclosure relates to a crash-resistant structural part for an automobile and to a manufacturing method for manufacturing such a crash-resistant structural part. More particularly, the disclosure relates to a crash-resistant structural part for an automobile comprising a crash-resistant structural part and a manufacturing method thereof.

BACKGROUND

Automobiles have been equipped with bumper beams since the early decades of their development, as crash-resistant structural parts that are mounted to the front of the automobiles in order to withstand impact force in the event of a crash to prevent or limit internal damage to the automobiles. Nowadays, most jurisdictions require bumper beams on both front and rear of the automobiles, while similar crash-resistant structural parts may additionally be provided, e.g., at sidewalls or across the top of the automobiles.

In currently manufactured automobiles, the bumper beams are usually hidden from view underneath a cover conforming to an automobile body design and are typically made of steel, being assembled with additional parts such as crash boxes for absorbing impact energy. While steel has the necessary strength and stiffness required for crash resistance, it is also heavy and difficult to have complex shapes demanded by the automobile body design. Therefore, it is often necessary to construct a bumper beam assembly including further elements, such as additional stiffeners and brackets linking the stiffeners to the bumper beam, which further adds weight and complicates manufacturing.

U.S. Pat. No. 6,346,325 B1 discloses manufacturing a bumper beam as a fiber-reinforced rigid thermoplastic composite article by making use of a depolymerization-repolymerization (DPRP) mechanism. The manufacturing process includes drawing a fiber bundle continuously through a melt obtained by heating rigid thermoplastic polyurethane that contains a catalyst to a temperature sufficient to depolymerize the thermoplastic polyurethane. The drawn fiber bundle is impregnated with the depolymerized thermoplastic polyurethane to form a composite melt. The composite melt is shaped into an article, and the article is encased with a thermoplastic resin.

However, because there is a maximum temperature to which the melt can be heated without losing its ability to repolymerize, the viscosity of the melt during impregnation of the fiber bundle is limited by a corresponding minimum viscosity, which poses an upper limit on the fiber content, and therefore, the strength-to-weight ratio achievable in the finished article. Accordingly, it is desirable to provide a bumper beam or other crash-resistant structural part for an automobile that has a favorable strength-to-weight ratio and is easy to manufacture.

SUMMARY

An aspect of the present disclosure provides a method of manufacturing a crash-resistant structural part for an automobile and a crash-resistant structural part for an automobile.

An exemplary embodiment of the disclosure provides a method of manufacturing a crash-resistant structural part for an automobile, the crash-resistant structural part including a beam element for receiving an impact force during a crash of the automobile. The method includes a step of arranging at least one layer of fibers having a length of 100 mm or more. Components are mixed to form a thermoplastic polymer resin and include a reactive monomer, thereby forming a liquid precursor mixture of the thermoplastic polymer resin. At least one layer of fibers is impregnated with the liquid precursor mixture, and the beam element is formed by an in-situ polymerization reaction of the liquid precursor mixture having impregnated the at least one layer of fibers.

The method further comprises a step of pre-heating the at least one layer of fibers before the step of impregnating the at least one layer of fibers with the liquid precursor mixture.

The step of impregnating the at least one layer of fibers and the step of forming the beam element are performed in a continuous pultrusion process.

The reactive monomer is a cyclic monomer, and the in-situ polymerization reaction is performed via ring-opening polymerization of the reactive monomer. The method further comprises a step of injection molding from a thermoplastic material, at least one overmolded element of the crash-resistant structural part, thereby bonding the at least one peripheral element to the beam element.

Another exemplary embodiment of disclosure provides a crash-resistant structural part for an automobile for receiving an impact force during a crash of the automobile manufactured by a manufacturing method. The method includes a step of arranging at least one layer of fibers having a length of 100 mm or more. Components are mixed to form a thermoplastic polymer resin and include a reactive monomer, thereby forming a liquid precursor mixture of the thermoplastic polymer resin. At least one layer of fibers is impregnated with the liquid precursor mixture, and the beam element is formed by an in-situ polymerization reaction of the liquid precursor mixture having impregnated the at least one layer of fibers.

At least one layer of fibers may comprise a fiber content of 50% to 75% by volume, preferably 70% by volume, of the beam element.

At least one layer of fibers includes a layer of glass fibers and/or a layer of carbon fibers.

At least one layer of fibers includes a central layer and further layers arranged symmetrically on both sides of the central layer.

The central layer comprises glass fibers, wherein the further layers include outer layers comprising glass fibers and intermediate layers comprising carbon fibers, each intermediate layer being arranged between an outer layer and the central layer.

The beam element comprises a corrugated cross section.

The corrugated cross section comprises a central corrugation valley and peripheral corrugation valleys arranged on both sides of the central corrugation valley, wherein the central corrugation valley has a greater depth than the peripheral corrugation valleys.

The corrugated cross section comprises a central corrugation valley and a front wall closing the central corrugation valley by forming an internal void of the corrugated cross section.

Another exemplary embodiment of the present disclosure provides an automobile including the crash-resistant structural part. The part includes a beam element for receiving an impact force during a crash of the automobile manufactured by a manufacturing method. The method includes a step of arranging at least one layer of fibers having a length of 100 mm or more. Components are mixed to form a thermoplastic polymer resin and include a reactive monomer, thereby forming a liquid precursor mixture of the thermoplastic polymer resin. At least one layer of fibers is impregnated with the liquid precursor mixture, and the beam element is formed by an in-situ polymerization reaction of the liquid precursor mixture having impregnated the at least one layer of fibers.

BRIEF DESCRIPTION OF DRAWINGS

Unless indicated otherwise, like reference numbers throughout the figures indicate like elements.

DETAILED DESCRIPTION

Figure 1:
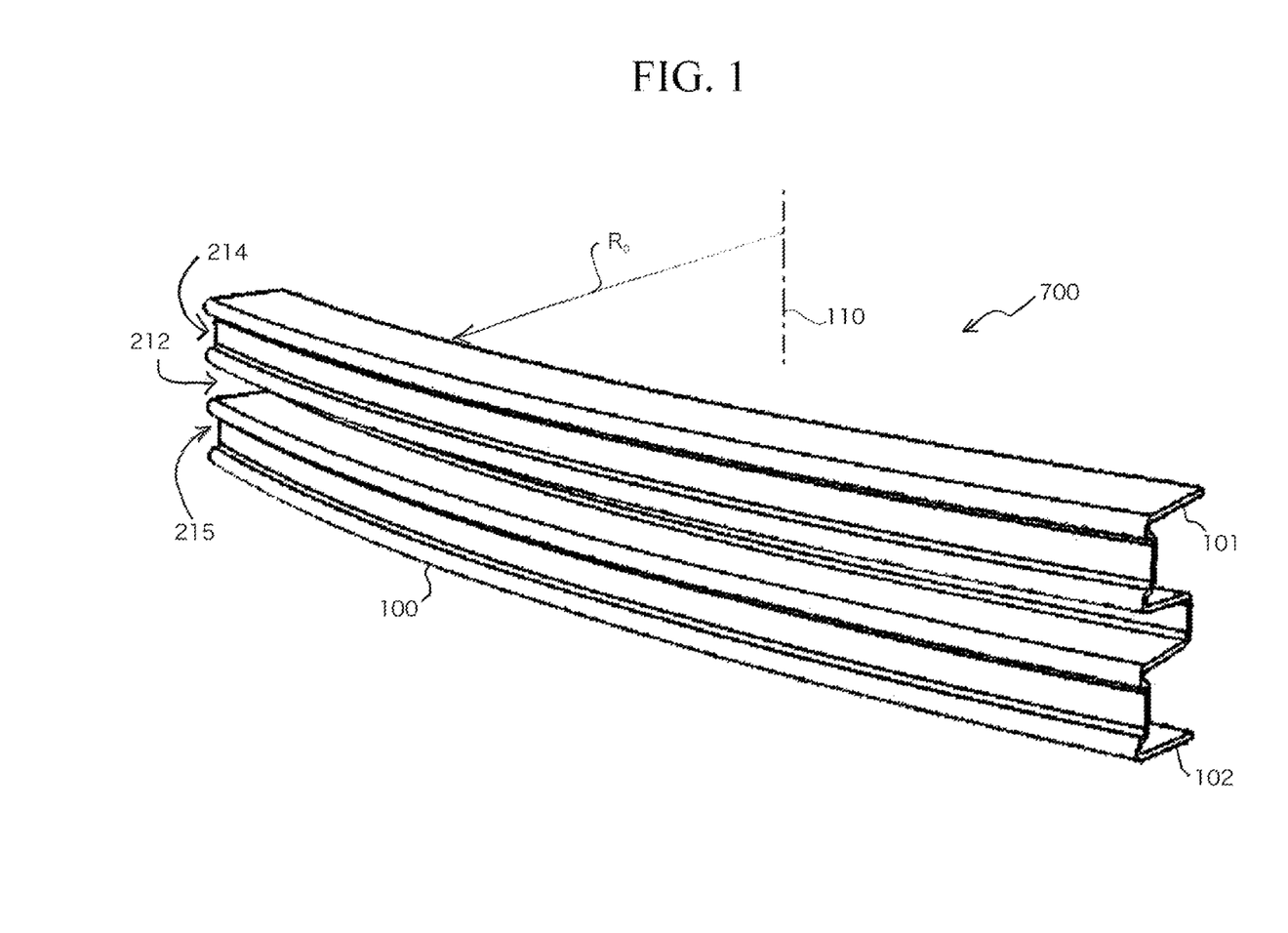
FIG. 1 is a perspective drawing of a crash-resistant part for an automobile, comprising a beam element, according to an embodiment of the disclosure.

FIG. 1 shows, in a perspective drawing, a crash-resistant structural part 700 for an automobile (not shown), intended to be mounted at the front side of the automobile to function as a bumper beam. In FIG. 1, the crash-resistant structural part 700 is oriented as when built into an automobile, with a view direction corresponding to viewing from a position close to a front left corner of the automobile. The crash-resistant structural part 700 entirely consists of a profiled beam element 100 made of a fiber-reinforced thermoplastic resin, and having a slight lengthwise curvature around a curvature axis 110 with a radius of curvature $R_0$ of 2000 mm that is convex toward the front of the automobile and a corrugated profile shown in a detailed cross section in FIG. 2A.

Figure 2A:
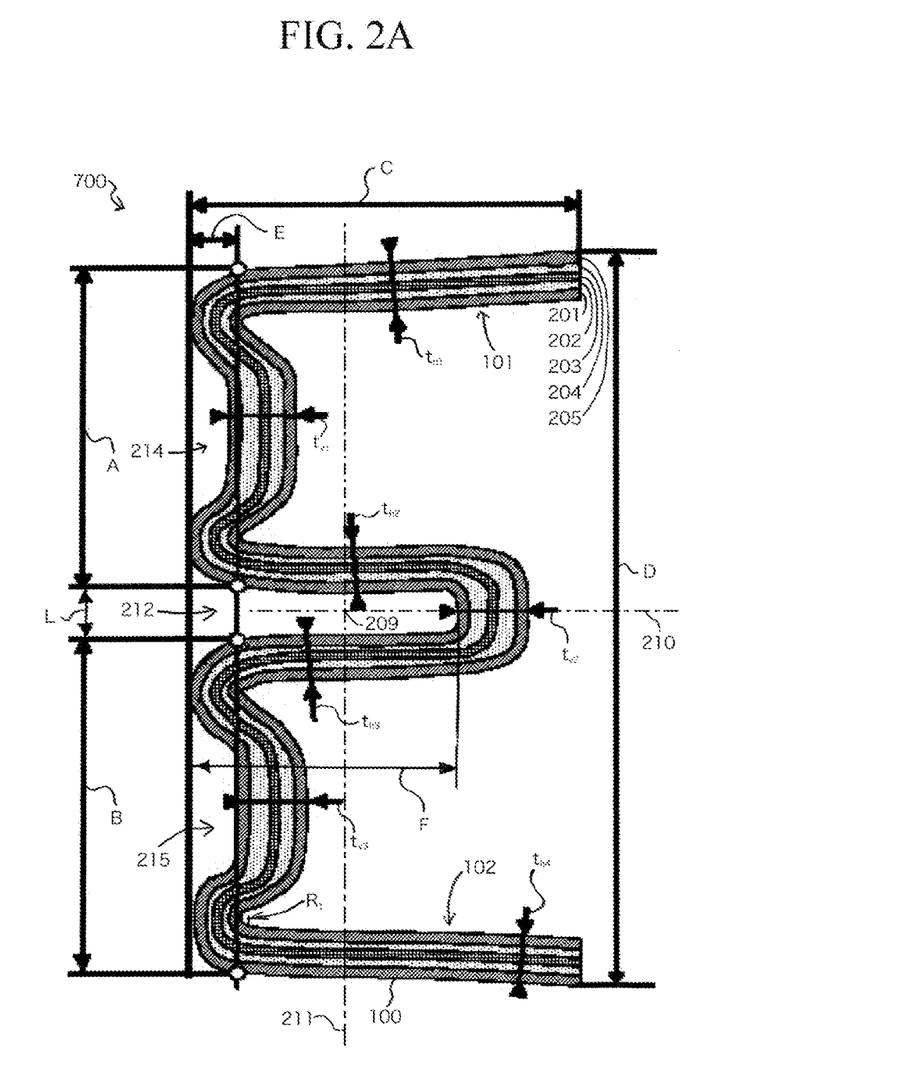
FIG. 2A is a schematic drawing showing a cross section of a crash-resistant part of FIG. 1.

The profile of the beam element 100, shown oriented in FIG. 2A as when built into the automobile with the front end of the automobile toward the left of FIG. 2A, is mirror symmetric around a horizontal plane of symmetry 210 with an overall profile height D of 110 mm and an overall profile depth C of 60 mm. A centroid 209 of the cross section is indicated on the horizontal plane of symmetry 210. Furthermore a balance surface 211 is indicated, which perpendicularly crosses the horizontal plane of symmetry 210 at the mass centroid 209 and divides the cross section into two portions of equal mass per length of the beam element 100. Due to the curvature of the beam element 100, the balance surface 211 forms a cylindrical surface with radius $R_0$. The profile is formed of a profile wall 101-102 following a corrugation pattern and ending at both ends in a respective flat top wall 101 and bottom wall 102 of the profile, both slightly angled away from the plane of symmetry 210 toward the interior of the automobile. At the front end of the bottom wall 102, the profile wall 101-102 turns sharply upwards in an about-turn with an interior radius of curvature $R_1$ of 3 mm, then upward again to extend vertically, forming a first peripheral corrugation valley 215 having a depth E at maximum of 10 mm. At the upper end of the first peripheral corrugation valley 215, the profile wall 101-102 turns toward the front end of the profile again, then turn sharply backwards to form a central corrugation valley 212 having a depth F of 40 mm and an internal height L of 8 mm, resulting in a vertical distance B of 50 mm between the highest point of the bottom side of the bottom wall 102 and the top side of the lower side wall of the central corrugation valley 212. The central corrugation valley is formed symmetric around the plane of symmetry 210. Moreover, since the overall path of the profile wall 101-102 beyond the central corrugation valley 212 via a second peripheral corrugation valley 214 to the top wall 101 follows from its symmetry with respect to the plane of symmetry 210, a repetition of the description is omitted.

The fiber reinforcement of the beam element 100 is formed of five layers 201, 202, 203, 204, 205 arranged symmetrically around a central layer 203. The layers 201, 202, 203, 204, 205 may have different thickness in different portions of the profile wall 101-102, as indicated by several thickness markings $t_{h1}$, $t_{h2}$, $t_{h3}$, $t_{h4}$ in horizontal portions and $t_{v1}$, $t_{v2}$, $t_{v3}$ in vertical portions of the profile wall 101-102. The central layer 203 is formed of a glass fiber woven or non-crimp fabric reinforcement, designed for high-speed performance to avoid total rupture of the beam element 100 in case of a crash, and for avoiding torsional movement of the beam element 100. In the present embodiment, a glass fiber fabric of 0.5 mm thickness throughout is employed. The central fabric layer 203 is sandwiched between two intermediate layers 202, 204 formed of carbon fiber rovings, each comprising carbon fibers running in parallel along the length of the beam element 100. In the vertical portions of the profile wall 101-102 as marked by $t_{v1}$, $t_{v2}$, $t_{v3}$ within the corrugation valleys 214, 212, 215, the intermediate layers 202, 204 have a thickness of 0.75 mm, while in the remaining profile wall 101-102 portions as marked by $t_{h1}$, $t_{h2}$, $t_{h3}$, $t_{h4}$ the thickness of the intermediate layers is 0.5 mm. Outer layers 201, 205 formed of glass fiber rovings are positioned next to the intermediate layers 202, 204 on the side opposite the central fabric layer 203, each having a thickness of 0.5 mm and comprising glass fibers running in parallel along the length of the beam element 100.

Each dimension given in the description of the beam element 100 above is purely exemplary and may differ in each embodiment. For example, the radius of curvature $R_0$ may be chosen from the interval between 1000 mm and 5000 mm. Also, the vertical distances A and B between the lowest point of a top side of the top wall 101 to a bottom side of the upper side wall of the central corrugation valley 212 where A is the vertical distance, are 50 mm each in the present embodiment. However, they may each be between 25 mm and 75 mm, with different values for A and B being possible, and A+B may be between 100 mm and 150 mm. Similarly, C may be chosen from between 50 mm and 100 mm, while D may be chosen from between 100 mm and 200 mm. The interior radius of curvature $R_1$ may be adjusted in accordance with the minimum radius at which the surface of the beam element 100 remains wrinkle-free in a manufacturing process for the beam element 100.

The thickness of the intermediate layers 202, 204 in the vertical portions of the profile wall 101-102 as marked by $t_{v1}, t_{v2}, t_{v3}$ as well as the thickness of the central fabric layer 203 throughout may lie between 0 mm (i.e. the respective layer 202, 203, 204 being absent) and 3 mm, while the thickness of the intermediate layers 202, 204 in the horizontal profile wall 101-102 portions as marked by $t_{v1}, t_{v2}, t_{v3}$ as well as the thickness of the outer layers 201, 205 throughout may lie between 0 mm (i.e. the respective layer 201, 202, 204, 205 being absent) and 2 mm. Different values may be chosen not only for each layer 201, 202, 203, 204, 205 separately but also separately for each profile wall 101-102 portion as marked by $t_{h1}, t_{h2}, t_{h3}, t_{v1}, t_{v2}$, and $t_3$. Furthermore, in embodiments, different types of layers such as rovings, woven fabrics, non-crimp fabrics, or non-woven mats from different kinds of fibers such as glass, carbon, Kevlar, or basalt fibers may be chosen for the layers 201, 202, 203, 204, 205. To avoid deformation of the beam element 100 due to differing coefficients of thermal expansion, the respective layers 201, 202, 203, 204, 205 may be configured, such that, each type of layer (i.e. the central fabric layer 203, the outer layers 201, 205, and the intermediate layers 202, 204) is equally distributed toward both sides of the balance surface 211, in addition to being equally distributed toward both sides of the plane of symmetry 210.

The layers 201, 202, 203, 204, 205 forming the fiber reinforcement of the beam element 100 are bonded together by a common matrix of a thermoplastic resin (present but not particularly shown in FIGS. 1 and 2) formed by reactive in-situ polymerization after impregnating the layers 201, 202, 203, 204, 205 with a liquid precursor mixture. The thermoplastic resin may be anionic polyamide 6 (APA 6), anionic polyamide 12 (APA 12), polybutylene terephthalate (PBT), thermoplastic polyurethane (TPU), or other thermoplastic resin that can be formed by reactive in-situ polymerization. In the cases of APA 6 and APA 12, being formed from caprolactam and lauryllactam, respectively, additives to act as catalyst and activator for anionic polymerization are available, for example, from L. Bruggemann KG under the commercial name of Bruggolen®, or from Rhein Chemie Rheinau GmbH under the commercial name Addonyl®. Polybutylene terephthalate (PBT) can be obtained e.g. from Cyclics Corporation under the trade name of Cyclics CBT®, and TPU resins can be bought e.g. from Lubrizol Corporation under the trade name Estane®.

Figure 2B:
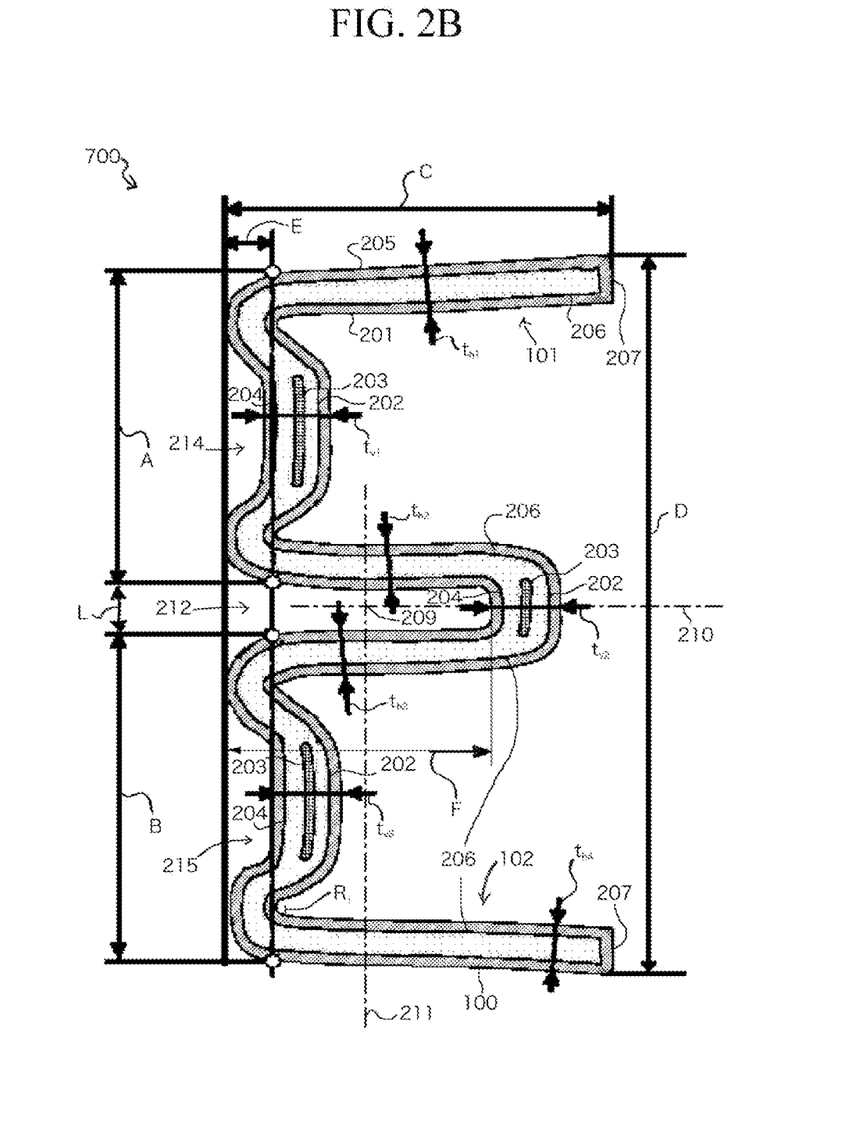
FIG. 2B is a schematic drawing showing an alternative cross section of a crash-resistant part of FIG. 1, according to another embodiment of the present disclosure.

FIG. 2B shows a differently configured cross section, in which an outward shape to the cross section is identical as shown in FIG. 2A. Due to the identical outward shape, the beam element 100 shown in FIG. 1 may, in different embodiments, comprise either one of the cross sections shown in FIGS. 2A and 2B, or may comprise both cross sections in different portions of the beam element 100. In the cross section of FIG. 2B, the central fabric layer 203 is formed in three separate portions of the profile wall 101-102, namely in those portions where the profile wall 101-102 runs vertically, in parallel to the balance surface 211. Thus, in each separate portion where the central fabric layer 203 is formed, a respective separate strip of the central fabric layer 203 is oriented parallel to the balance surface 211, such that, each point on the respective separate strip of the fabric layer 203 has the equal distance to the axis of curvature 110 of the beam element 100, as indicated by radius of curvature $R_0$ in FIG. 1. This enables to pull each separate strip of the fabric layer 203 at a different speed during manufacturing of the beam element 100 in a pultrusion process, thereby avoiding overstressing and creasing of the fabric layer 203 during manufacturing. In another embodiment, one or more additional strips of the fabric layer 203 may be provided in horizontal portions of the profile wall 101-102, wherein each additional strip has a width sufficiently narrow to avoid overstressing and creasing of the fabric layer 203 in the respective strip during manufacturing.

In the remaining portions of the profile wall 101-102 where the central fabric layer 203 is absent, the intermediate layers 202, 204 join to form a central layer of fiber rovings 206. At the end of the profile wall 101-102, the outer layers 201, 205 of glass fiber rovings are connected by end cover layers 207 of the same material. Thus, the entire outer surface of the beam element 100 is formed by glass fibers, such that carbon fibers of the central layer of fiber rovings 206 and the intermediate layers 202, 204 are encapsulated by glass fibers. This effectively protects from corrosion by preventing carbon fibers being exposed to the outside and coming into contact with water or moisture.

Figure 2C:
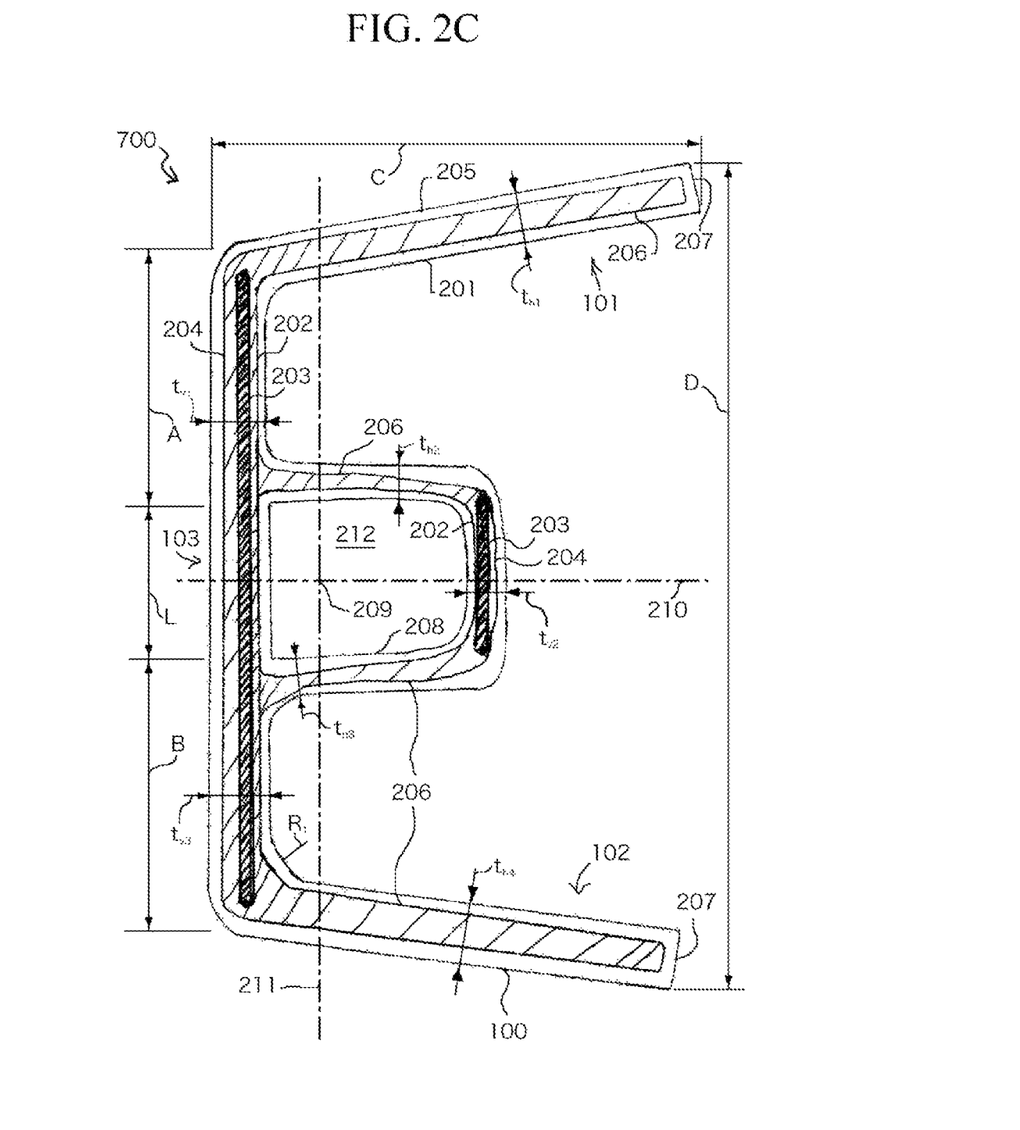
FIG. 2C is a schematic drawing showing a cross section of a crash-resistant part for an automobile, comprising a beam element, according to another embodiment of the present disclosure.

FIG. 2C shows a cross section of another beam element 100 of a crash-resistant structural part 700 for an automobile, which has an outer cross-sectional shape that differs from the beam element 100 shown in FIG. 1 but is otherwise formed in the same manner with radius of curvature $R_0$. FIG. 2C differs from the embodiments of FIGS. 2A and 2B in that no peripheral corrugation valleys are formed while the central corrugation valley 212 is closed toward the front of the automobile by an essentially flat front wall 103 that vertically extends between the front edges of the top wall 101 and the bottom wall 102 portions. Thus, an internal void is formed in the cross section, surrounded by the front wall 103 of the beam element 100 together with the valley bottom wall and peripheral walls of the central corrugation valley 212, with a further outer layer 208 of glass fiber rovings provided at the profile wall surface bordering on the internal void. The central fabric layer 203 is formed in two separate strips, which extend through the entire front wall 103 and through the entire valley bottom wall of the central corrugation valley 212, respectively. Thus, the central fabric layer 203 is formed in all vertically extending wall portions of the profile. In the present embodiment, the closed formation of the central corrugation valley 212 provides the beam element 100 with greater inertia and torsion resistance, thus enabling a high overall performance of the crash-resistant structural part 700.

Figure 3:
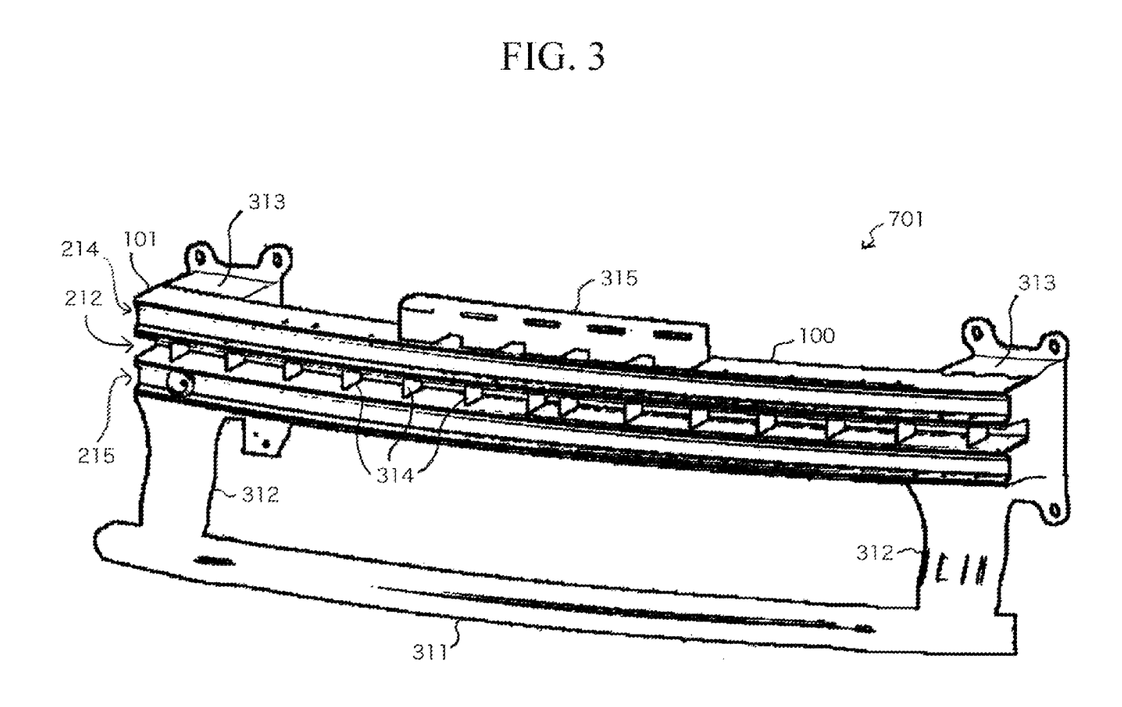
FIG. 3 is a perspective drawing of a crash-resistant part for an automobile, comprising a beam element and overmolded elements, according to an embodiment of the disclosure.
Figure 4:
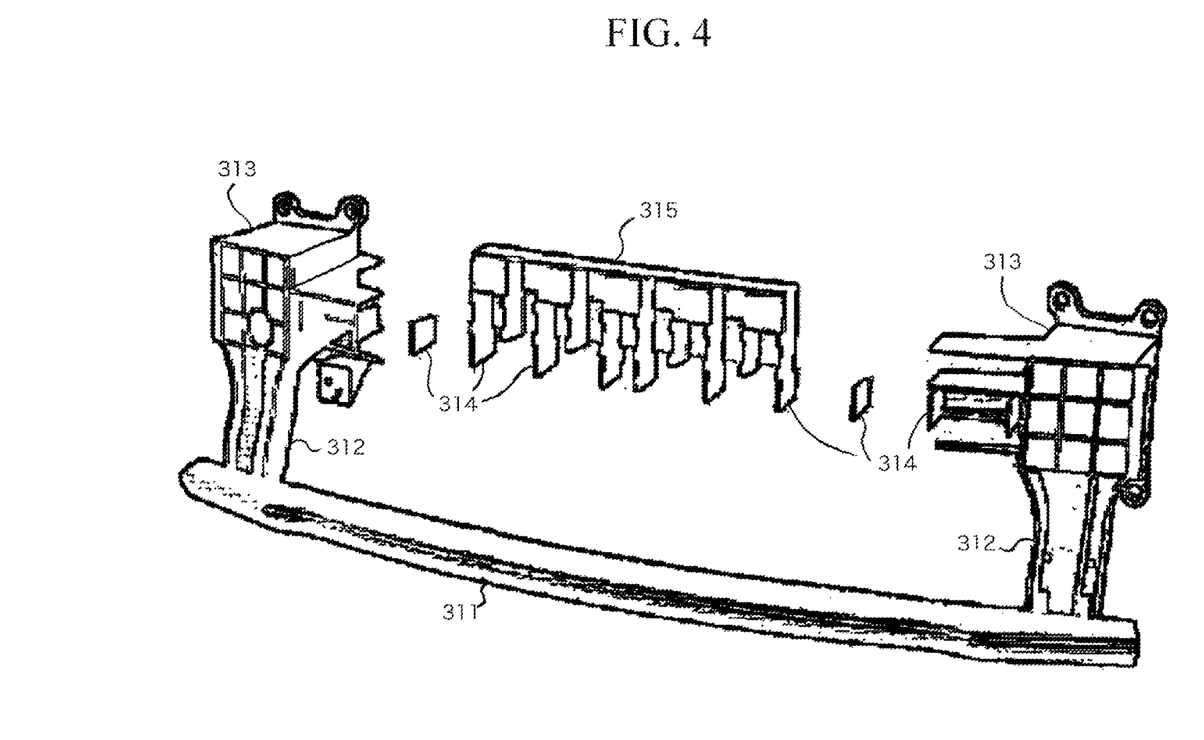
FIG. 4 is a perspective drawing showing overmolded elements of a crash-resistant part of FIG. 3, with a beam element being hidden from view.

FIG. 3 is a perspective drawing of another crash-resistant part 701 for an automobile, being a front bumper beam system, which comprises a beam element 100 identical to the beam element 100 of FIG. 1, together with overmolded elements 311, 312, 313, 314, 315 formed by injection molding from a thermoplastic material that may include fibers of short length. The overmolded elements 311, 312, 313, 314, 315 include a lower stiffener 311, brackets 312 for attaching the lower stiffener 311 to the beam element 100, crash boxes 313 attached at both ends of the beam element 100 toward the interior of the automobile, ribs 314 for providing support across the central corrugation valley 212, and additional stiffening elements 315. FIG. 4 shows only the overmolded elements 311, 312, 313, 314, 315, which are rigidly attached by overmolding to the beam element 100, in a perspective drawing corresponding to FIG. 3 with the beam element being hidden from view.

A manufacturing process for manufacturing the crash-resistant structural part 700 of FIG. 1 or the beam element 100 of any of FIGS. 1 to 4 will now be described with reference to FIG. 5, which shows a pultrusion apparatus 550 for manufacturing the crash-resistant structural part 700 in a schematic front view. The pultrusion apparatus 550 includes a fiber material storage device 552, where fiber material for the fiber layers 201, 202, 203, 204, 205 is kept on respective spools 501, 502, 503, 504, 505, and an alignment device 554 for aligning the fiber material according to the intended relative arrangement of the fiber layers 201, 202, 203, 204, 205 within the beam element 100 to be manufactured. A pre-heating device 520 pre-heat the aligned fiber material, and storage tanks 507 stores components 506, 508 required to form thermoplastic polymer resin 512. A mixing chamber 509 mixes the components 506, 508 to form a liquid precursor mixture 510 of the thermoplastic polymer resin 512. A pultrusion die 522 is equipped with a heating device 521 and has an internal profile corresponding to the desired external profile of the beam element 100 as well as a radius of curvature $R_0$ corresponding to the intended radius of curvature $R_0$ of the beam element 100 to be manufactured. A puller device 524 pulls a composite strand 525 formed of the fiber material and thermoplastic polymer resin from the pultrusion die 522, thereby driving the manufacturing process. A cutter device 526 cut the composite strand 525 into segments of a desired length of the beam element 100 to be manufactured.

In preparation of operation, the fiber material stored on the spools 501, 502, 503, 504, 505 is successively guided through the alignment device 554, the pre-heating device 520, the pultrusion die 522, the puller device 524, and the cutter device 526. Also, the storage tanks 507 are filled with the components 506, 508 required to form thermoplastic polymer resin 512, which are selected and prepared in such a way that at least one of the components 506 includes a reactive monomer, and that substantially no polymerization occurs while the components 506, 508 are kept separately from each other. The storage tanks 507 are heated to a temperature sufficiently high to store the components 506, 508 in liquid condition, e.g., to a temperature of 10° C. or more above the melting temperature of the respective reactive monomer. For example, the tanks 507 are heated to 79° C. in case of the reactive monomer being caprolactam, which has a melting point of 69° C., or to 162° C. in case of the reactive monomer being lauryllactam, which has a melting point of 152° C.

To start the manufacturing process, the fiber material is continuously or intermittently pulled by the puller device 524 out of the pultrusion die 522, causing fiber material in corresponding quantity to be drawn from the storage device 552. After having been aligned in the alignment device 554, the fiber material is pre-heated while passing through the pre-heating device 520 to enter the pultrusion die 522 at an elevated temperature. Simultaneously, the components 506, 508 are introduced into the mixing chamber 509 where they are intimately mixed to form a liquid precursor mixture 510, which is fed into the pultrusion die 522 at a position close to its entrance 560 into which the fiber material is being drawn by the action of the puller device 524. The liquid precursor mixture 510, before entering the pultrusion die 522, may be mixed and transported to the pultrusion die 522 at a temperature sufficiently low to prevent polymerization from occurring to a significant extent, in this way maintaining a low viscosity of the liquid precursor mixture 510.

Upon entering the pultrusion die 522, the liquid precursor mixture 510 impregnates the fiber material, entering even minute cavities between the fibers and thoroughly wetting the surface of the fibers due to its low viscosity. While the puller device 524 continues to draw the fiber material with the liquid precursor mixture 510 having impregnated the fibers through the pultrusion die 522, the heating device 521 maintains a temperature profile within the pultrusion die 522 that causes the liquid precursor mixture 510 to completely polymerize along the path of the impregnated fiber material through the pultrusion die 522, with polymerization starting first close to the surface of the fibers due to the fiber material having undergone pre-heating in the pre-heating device 520. As a result, a composite strand 525 having the composition, profile and curvature of the beam element 100 to be manufactured continuously leaves the pultrusion die 522 at its exit 561, where the cutter device 526 cuts the composite strand 525 to repeatedly provide the beam element 100.

The components 506, 508 to form the liquid precursor mixture 510 may be prepared in various ways, provided that no polymerization happens while the components 506, 508 are stored separately while the liquid precursor mixture 510 is capable to undergo in-situ polymerization into a thermoplastic polymer resin after having entered the pultrusion die 522. For example, reactive systems for forming an anionic polyamide (APA), thermoplastic polyurethane (TPU), or polybutylene terephthalate (PBT) may be chosen, wherein a reactive monomer may be contained in one of the components 506 while an initiator substance required for initiating the polymerization reaction is contained in the other component 508. In embodiments of the manufacturing method, more than two components may be mixed to form the liquid precursor mixture.

Figure 5:
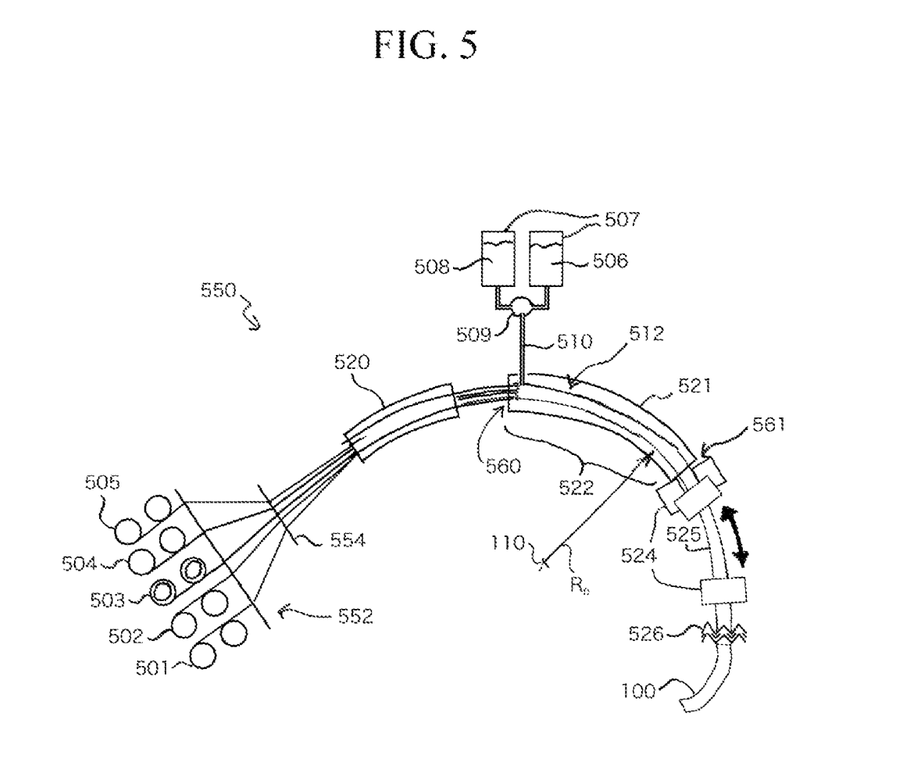
FIG. 5 is a schematic front view of a pultrusion apparatus performing a manufacturing method according to an embodiment of the present disclosure.
Figure 5A:
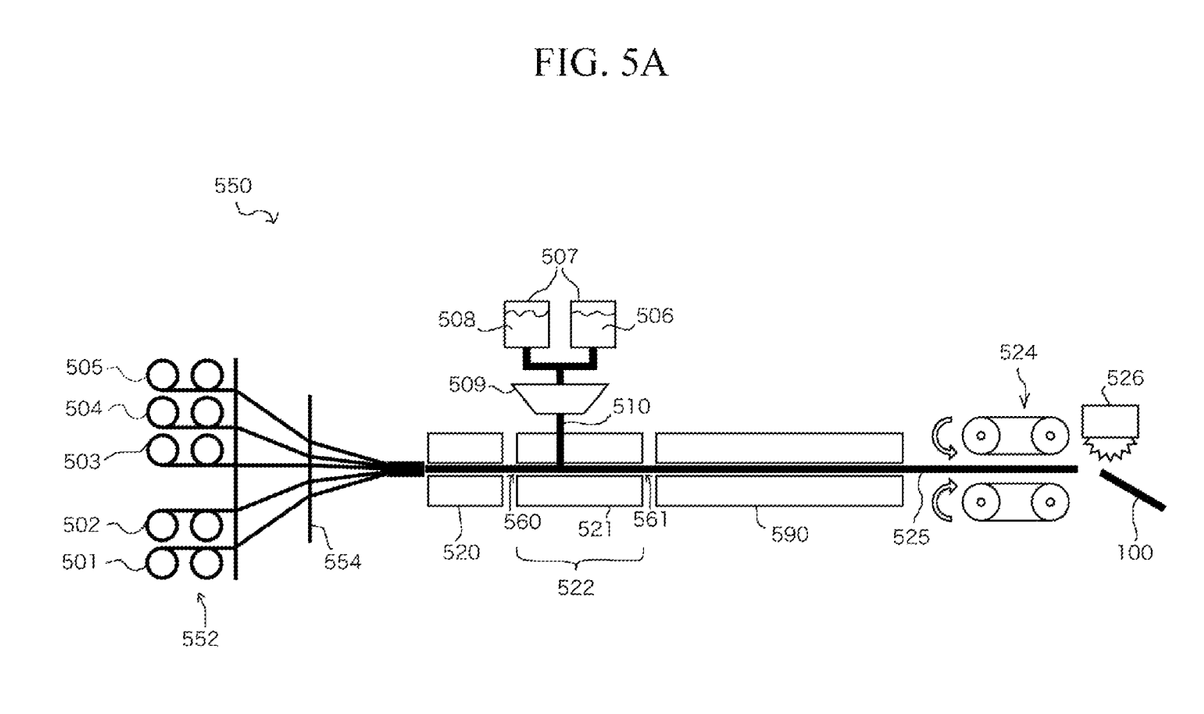
FIG. 5A is a schematic front view of a further pultrusion apparatus performing a manufacturing method according to an embodiment of the present disclosure.

FIG. 5A shows an alternatively configured pultrusion apparatus 550 that may be used for manufacturing the crash-resistant structural part 700 instead of the pultrusion apparatus shown in FIG. 5. Different from FIG. 5, a cooling device 590 for cooling the composite strand 526 that leaves the pultrusion die 521 is provided, while the pulling device 524 has a caterpillar configuration. Moreover, the pultrusion die 521 has a straight shape, such that, the composite strand 526 is formed in the pultrusion die 521 as a straight strand without curvature, corresponding to an infinite radius of curvature (not shown) in comparison to the radius of curvature $R_0$ of the composite strand 526 in FIG. 5. Consequently, beam elements 100 as produced by cutting the composite strand 526 leaving the pultrusion apparatus 550 of FIG. 5A do not possess curvature. However, a curvature may subsequently be imparted to the beam element 100 by a further process such as stamping. In this way, imparting a non-constant curvature on the beam element 100 is enabled. The stamping may be performed as a separate step, or may be efficiently performed in combination with an overmolding step such as will be described in the following.

Figure 6:
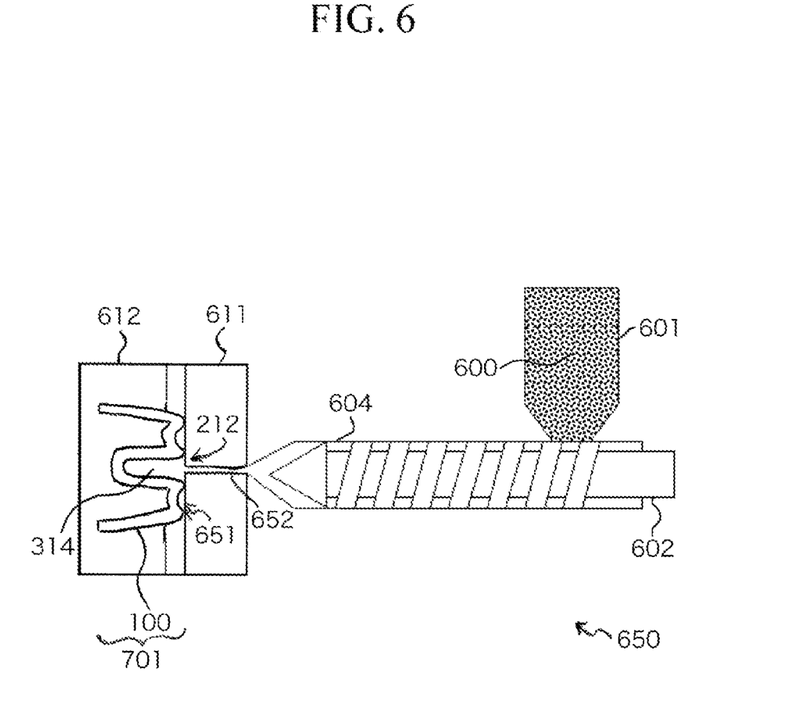
FIG. 6 is a schematic cross-sectional view of an injection-molding apparatus performing an overmolding step of a manufacturing method according to an embodiment of the present disclosure.

In order to manufacture a crash-resistant structural part including overmolded elements such as the crash-resistant structural part 701 shown in FIG. 3, a beam element 100 manufactured as explained above may be subjected to an overmolding step performed in an injection molding apparatus 650 as shown in FIG. 6. The injection molding apparatus 650 includes a two-part die comprising an upper half 611 and a lower half 612 in which a cavity 651 shaped corresponding to the outer shape of the crash-resistant structural part 701 is formed. At least one feed port 651 linking the cavity 651 to outside the two-part die 611, 612 is formed in the two-part die 611, 612. A heated injection barrel 604 with a screw shaft 602 arranged inside and linked to a hopper 601 containing a thermoplastic material in form of granules is positioned at the opening of the feed port 651.

In operation, the upper half 611 of the two-part die 611, 612 is removed from the lower half 612 to position the beam element 100 pre-manufactured as described above within the cavity 651 before the two-part die 611, 612 is closed again. In this way, one or more portions of the cavity 651 that correspond to one or more overmolded elements such as a rib 314 exemplarily outlined in FIG. 6 are formed as empty spaces that are bounded partially by the surface of the beam element 100. The thermoplastic material 600 is then fed into the injection barrel 604 where it is heated and by action of the screw shaft 602 injected in a molten condition through the feed port 651 into the empty space corresponding to the rib 314. The temperature of injected thermoplastic material and of the two-part die 611, 612 are chosen such that the thermoplastic resin of the beam element 100 is superficially molten when coming into contact with the injected thermoplastic material, thus forming a solid bond between the overmolded element being the rib 314 and the beam element 100 after both have completely solidified by cooling down below the respective melting point. Then, the two-part die 611, 612 is opened again to remove the finished crash-resistant structural part 701.

For the thermoplastic material 600, a material that is identical or chemically related to the thermoplastic resin 512 may be used in manufacturing the beam element 100 as described above. For additional strength, short fibers made of glass may be added. If a stamping process for imparting a curvature to the beam element 100 is performed in combination with the overmolding step, heat is supplied to the beam element 100 to soften its thermoplastic resin matrix, the cavity 651 being shaped such that placing the pre-manufactured beam element 100 within the cavity 651, and closing the two-part die 611, 612, exerts a force on the beam element 100 that results in the beam element 100 acquiring a curvature in agreement with the shape of the cavity 651.

Figure 7:
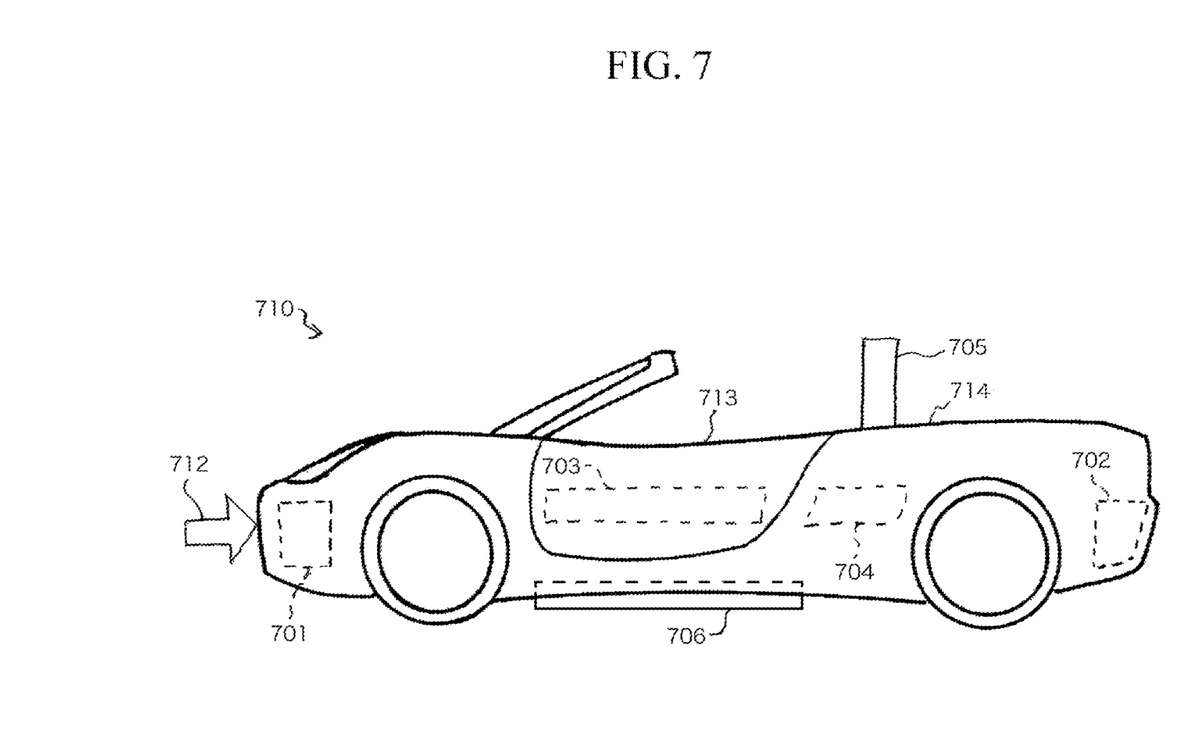
FIG. 7 is a schematic side view of an automobile according to an embodiment.

FIG. 7 is a schematic side view of an automobile 710, which is equipped with several crash-resistant structural parts 701, 702, 703, 704, 705 at different locations. The crash-resistant structural parts 701, 702, 703, 704, 705 include a front bumper beam 701, a rear bumper beam 702, a side bumper beam 703 built into a door 713 of the automobile 710, a side bumper beam 704 built into a side wall 714 of the automobile 710, a side sill 706, and a rollover bar 705.

What is claimed is:

1. A crash-resistant structural part for an automobile, the part comprising a beam element for receiving an impact force during a crash of the automobile, the crash-resistant structural part being manufactured by a manufacturing method, the method comprising:
arranging at least one layer of fibers having a length of 100 mm or more;
mixing components required to form a thermoplastic polymer resin, the components including a reactive monomer, thereby forming a liquid precursor mixture of the thermoplastic polymer resin;
impregnating the at least one layer of fibers with the liquid precursor mixture; and
forming the beam element by an in-situ polymerization reaction of the liquid precursor mixture having impregnated the at least one layer of fibers,
wherein the at least one layer of fibers includes a central layer and further layers arranged symmetrically on both sides of the central layer,
wherein the central layer is a woven or non-crimp fabric layer,
wherein the beam element comprises a curvature around a curvature axis, the central layer being provided in portions substantially parallel to the curvature axis and not provided in portions substantially nonparallel to the curvature axis,
wherein the beam element further includes two portions which are parallel to the curvature axis and which are spaced from each other, and
wherein the central layer is provided in both of the two portions parallel to the curvature axis.

2. The crash-resistant structural part according to claim 1, wherein the beam element for receiving the impact force is one of a front bumper beam, a rear bumper beam, a side beam, a door beam, a side sill, and a rollover bar of the automobile.

3. The crash-resistant structural part according to claim 1, wherein the at least one layer of fibers comprises a fiber content of 50% to 75% by volume of the beam element.

4. The crash-resistant structural part according to claim 1, wherein the at least one layer of fibers includes a layer of glass fibers and/or a layer of carbon fibers.

5. The crash-resistant structural part according to claim 1, wherein the beam element comprises a corrugated cross section.

6. The crash-resistant structural part according to claim 5, wherein the corrugated cross section is symmetric with respect to reflection at a symmetry plane of the beam element.

7. The crash-resistant structural part according to claim 5, wherein the corrugated cross section comprises a central corrugation valley and peripheral corrugation valleys arranged on both sides of the central corrugation valley, the central corrugation valley having a greater depth than the peripheral corrugation valleys.

8. The crash-resistant structural part according to claim 5, wherein the corrugated cross section comprises a central corrugation valley and a front wall closing the central corrugation valley by forming an internal void of the corrugated cross section.

9. The crash-resistant structural part according to claim 1, further comprising at least one overmolded element comprising a thermoplastic material bonded to the beam element.

10. A crash-resistant structural part for an automobile, the part comprising a beam element for receiving an impact force during a crash of the automobile, the crash-resistant structural part being manufactured by a manufacturing method, the method comprising:
arranging at least one layer of fibers having a length of 100 mm or more;
mixing components required to form a thermoplastic polymer resin, the components including a reactive monomer, thereby forming a liquid precursor mixture of the thermoplastic polymer resin;

impregnating the at least one layer of fibers with the liquid precursor mixture; and forming the beam element by an in-situ polymerization reaction of the liquid precursor mixture having impregnated the at least one layer of fibers, wherein the at least one layer of fibers includes a central layer and further layers arranged symmetrically on both sides of the central layer, wherein the central layer comprises glass fibers, wherein the further layers include outer layers comprising glass fibers and intermediate layers comprising carbon fibers, each intermediate layer being arranged between an outer layer and the central layer, the beam element includes two portions which are parallel to the curvature axis and which are spaced from each other, and wherein the central layer is provided in both of the two portions parallel to the curvature axis.

* * * * *